(12) United States Patent
Hsieh et al.

(10) Patent No.: US 9,934,599 B2
(45) Date of Patent: Apr. 3, 2018

(54) METHOD OF CAPTURING AND RECONSTRUCTING COURT LINES

(71) Applicant: MING CHUAN UNIVERSITY, Taipei (TW)

(72) Inventors: Chaur-Heh Hsieh, Taipei (TW); Hsing-Yu Yeh, Taipei (TW)

(73) Assignee: Ming Chuan-University, Taipei (TW)

( * ) Notice: Subject to any disclaimer, the term of this patent is extended or adjusted under 35 U.S.C. 154(b) by 0 days.

(21) Appl. No.: 15/194,754

(22) Filed: Jun. 28, 2016

(65) Prior Publication Data

US 2017/0337714 A1    Nov. 23, 2017

(30) Foreign Application Priority Data

May 20, 2016 (TW) .............................. 105115655 A

(51) Int. Cl.
    *G06K 9/34* (2006.01)
    *G06T 11/00* (2006.01)
    (Continued)

(52) U.S. Cl.
    CPC .......... *G06T 11/005* (2013.01); *G06K 9/4633* (2013.01); *G06K 9/6218* (2013.01);
    (Continued)

(58) Field of Classification Search
    USPC ....... 382/173, 276, 103, 112, 118, 163, 266; 348/169, 598; 358/448; 473/422;
    (Continued)

(56) References Cited

U.S. PATENT DOCUMENTS

| 7,515,735 B2 * | 4/2009 | Miyamori | ................ G06T 7/20 382/103 |
| 8,599,317 B2 * | 12/2013 | Shamur | ............... G11B 27/036 348/169 |

(Continued)

*Primary Examiner* — Anh H Do

(74) *Attorney, Agent, or Firm* — Rosenberg, Klein & Lee

(57) ABSTRACT

A method of extracting and reconstructing court lines includes the steps of binarizing a court image of a court including court lines to form a binary image; performing horizontal projection for the binary image; searching for plural corners in the binary image and defining a court line range by the corners; forming plural linear segments from images within the court line range by linear transformation; defining at least one first cluster and at least one second cluster according to the characteristics of the linear segments and categorizing the linear segments into plural groups; taking an average of each group as a standard court line and creating a linear equation of the standard court line to locate the point of intersection of the standard court lines; and reconstructing the court lines according to the point of intersection. This method is capable of extracting the image of a portion of the court line from a dynamic or static image having a court line quickly to eliminate interference caused by noises coming from a portion other than the court line such as the background color, ambient brightness, people or advertisement, and reconstructing the court lines quickly and accurately to facilitate the determination of the boundary of a court line or the computation of data.

15 Claims, 30 Drawing Sheets

(51) Int. Cl.
*G06T 7/00* (2017.01)
*G06K 9/62* (2006.01)
*G06T 5/30* (2006.01)
*G06K 9/46* (2006.01)

(52) U.S. Cl.
CPC .............. *G06T 5/30* (2013.01); *G06T 7/0085* (2013.01); *G06K 2009/4666* (2013.01); *G06T 2207/20061* (2013.01); *G06T 2207/30228* (2013.01); *G06T 2210/21* (2013.01)

(58) Field of Classification Search
USPC .............................................. 700/91; 706/52
See application file for complete search history.

(56) References Cited

U.S. PATENT DOCUMENTS

| | | | | |
|---|---|---|---|---|
| 8,855,375 | B2 * | 10/2014 | Macciola | H04N 1/387 358/448 |
| 8,873,813 | B2 * | 10/2014 | Tadayon | G06K 9/00 382/118 |
| 9,615,188 | B2 * | 4/2017 | Dublin | H04S 7/303 |

* cited by examiner

METHOD OF CAPTURING AND RECONSTRUCTING COURT LINES

FIELD OF THE INVENTION

The present invention relates to a method of extracting and reconstructing court lines, more particularly to a method capable of capturing a court image including court lines and reconstructing the court lines quickly and accurately to facilitate the determination of the boundary of a court line or the computation of data.

BACKGROUND OF THE INVENTION

Court lines are used for defining the boundary of a court, and the rules of many playing activities are defined by court lines. Court lines are defined in many sports such as tennis or badminton to specify a service or return placement and the moving range of a player. The court line is not only just applied for determining whether a foul of a game occurs, but also can be utilized for conducting various analyses of sport games and make tactical plans; for instance, automatic score counting, and automatic mining of player's movement habits and styles. Obviously, the extraction, reconstruction, and analysis of the court lines have become essential techniques for sport event study.

The reconstruction and analysis of the court line are generally conducted through photo images taken by a camera. However, even in the same sport, the color of the photo images, the installation position of the camera, and the advertising vary with different courts. For example, the courts of tennis sport include red clay courts or blue hard courts. This increases the level of difficulty and complexity of reconstructing the court line from images significantly, and thus the court reconstruction has become a challengeable research subject.

In the conventional way of reconstructing the court line, the difference between the color of the court and the color of its advertising signs is used to binarize an image, and the position of a court line is found by horizontal projection. In another prior art, the court line is extracted by using the white dot recognition and main color recognition methods. However, if the color of the court and the color of the advertising background are the same but the different colors of materials, different brightness of the environment, and different installation positions of the camera will cause a failure of reconstructing the court line, and thus the conventional reconstruction of the court line is still not applicable for different environmental factors.

In view of the aforementioned problems of the prior art, the inventor of the present invention based on years of experience in the related industry to conduct extensive researches and experiments, and finally provided a feasible solution to overcome the problems of the prior art.

SUMMARY OF THE INVENTION

It is a primary objective of this disclosure to provide a method of extracting and reconstructing court lines, comprising the steps of binarizing a court image of a court including a court line to form a binary image; searching for a plurality of corners in the binary image and defining a court line range by the corners; forming a plurality of linear segments from an image within the court line range by linear transformation; defining at least one first cluster and at least one second cluster according to the characteristics of the linear segments, and categorizing the linear segments into a plurality of groups according to the first cluster and the second cluster; taking an average of each group as a standard court line, and creating a linear equation of the standard court line to locate the position of a point of intersection of the standard court lines; and reconstructing the court line according to the point of intersection.

The method of extracting and reconstructing court lines further comprises the sub-steps of performing a gradient computation of the court image to produce a horizontal gradient image and a vertical gradient image, and combining the horizontal gradient image and the vertical gradient image to form the binary image.

The method of extracting and reconstructing court lines further comprises the sub-steps of defining a threshold according to the color of the court line, and forming the binary image by the threshold screening when the horizontal gradient image and the vertical gradient image are combined.

The method of extracting and reconstructing court lines further comprises the sub-steps of performing a horizontal projection of the binary image to form a first horizontal projection image; defining a range of the first horizontal projection image with a horizontal cumulative value greater than a cumulative threshold to be a search range, and searching for the corners in the search range.

The method of extracting and reconstructing court lines further comprises the sub-steps of using Equation 1 to filter out the noise of the first horizontal projection image to form a second horizontal projection image:

$$F_i = \begin{cases} \frac{|p_i - \mu| \times k}{\sigma}, & p_i > \mu \\ 0, & \text{Otherwise} \end{cases} \quad \text{(Equation 1)}$$

wherein, $F_i$ is a second horizontal projection image; $p_i$ is a horizontal cumulative value of the corresponding first horizontal projection image; $\mu$ is an average of the horizontal cumulative values of the first horizontal projection image; and $\sigma$ is a standard deviation; defining the cumulative threshold by Equation 2:

$$T = \max\left(\frac{F_i}{\rho}\right) \quad \text{(Equation 2)}$$

wherein, $\rho$ is a magnification constant; and defining a range of the second horizontal projection image with a horizontal cumulative value greater than the cumulative threshold as the search range.

In the method of extracting and reconstructing court lines, the first horizontal projection image is formed by performing a horizontal projection at a middle third of the binary image.

The method of extracting and reconstructing court lines further comprises the sub-steps of setting the court line as a quadrilateral, and creating a binary search image and its search coordinates, and dividing the search image into an upper left blank, an upper right blank, a lower left blank and a lower right blank through the search coordinates; slidably searching the search image in the binary image, and performing a convolution of the binary image; and defining the maximum after convolution takes place as the corner.

In the method of extracting and reconstructing court lines, the convolution of the search image and the binary image is carried out by Equation 3:

$$O(i,j)=\sum_{s=-4}^{4}\sum_{t=-4}^{4}m(s,t)\times p(i+s,j+t); (i^*,j^*)=\underset{(i,j)}{\mathrm{argmax}}\, O \qquad \text{(Equation 3)}$$

wherein O(i,j) is a corner; m(s,t) is a search image; and p(i,j) is a binary image.

The method of extracting and reconstructing court lines further comprises the sub-steps of performing a thinning process after the image in the court line range is processed by a closing process, and then forming the linear segment by linear transformation.

The method of extracting and reconstructing court lines further comprises the sub-step of performing a Hough transform of the court line in the court line range to form the linear segment.

The method of extracting and reconstructing court lines further comprises the sub-steps of using the first cluster to classify a horizontal segment in the linear segment according to the slope and the position of the Y-axis coordinate; and using the second cluster to classify a vertical segment in the linear segment according to the slope and the intercept.

In the method of extracting and reconstructing court lines, the court line is a tennis court line, and six first clusters and five second clusters are defined according to the characteristics of the linear segment.

In the method of extracting and reconstructing court lines, the court line is a tennis court line, and a standard court line obtained by taking an average of the group classified according to the first cluster and the second cluster is provided for computing 30 points of intersection.

In the method of extracting and reconstructing court lines, the point of intersection is used to reconstruct the court line according to the court line position by a line function.

The method of extracting and reconstructing court lines further comprises the sub-steps of setting the site image as a dynamic continuous image, defining a first constant value, a second constant value and a computing value, computing the distance value between the point of intersection of the current site image position and the point of intersection of the previous site image at the corresponding position, and increasing the computing value if the distance value is smaller than the first constant value, and computing an error threshold $T_e$ by Equation 4 if the computing value is greater than the second constant value:

$$T_e = \frac{\alpha}{30}\left[\sum_{i=1}^{30} |P_i(k+1) - P_i(k)|\right] \qquad \text{(Equation 4)}$$

wherein, α is an error magnification constant; and replacing the reconstructed court line of the current frame by the reconstructed court line of the previous frame if the distance value is greater than the error threshold at any point of intersection.

In summation of the description above, the present invention has the following advantages and effects:

After the present invention binarizes a court image including a court line, a search range is obtained by horizontal projection, and the search image is used to locate a corner to define a desired court line range, so that noises of the court line range are eliminated, a linear transformation and a classification are used to define a standard court line, so as to search for a point of intersection of the court lines and facilitate the construction of the court line. Regardless of the different colors of different sites, the complicated site background, the blocking by staffs or the brightness of the environment, the present invention can search for a point of intersection of the court line quickly and accurately to facilitate the reconstruction of the court line.

DESCRIPTION OF THE PREFERRED EMBODIMENTS

The technical contents of this disclosure will become apparent with the detailed description of preferred embodiments accompanied with the illustration of related drawings as follows. It is intended that the embodiments and figures disclosed herein are to be considered illustrative rather than restrictive.

Figure 1:
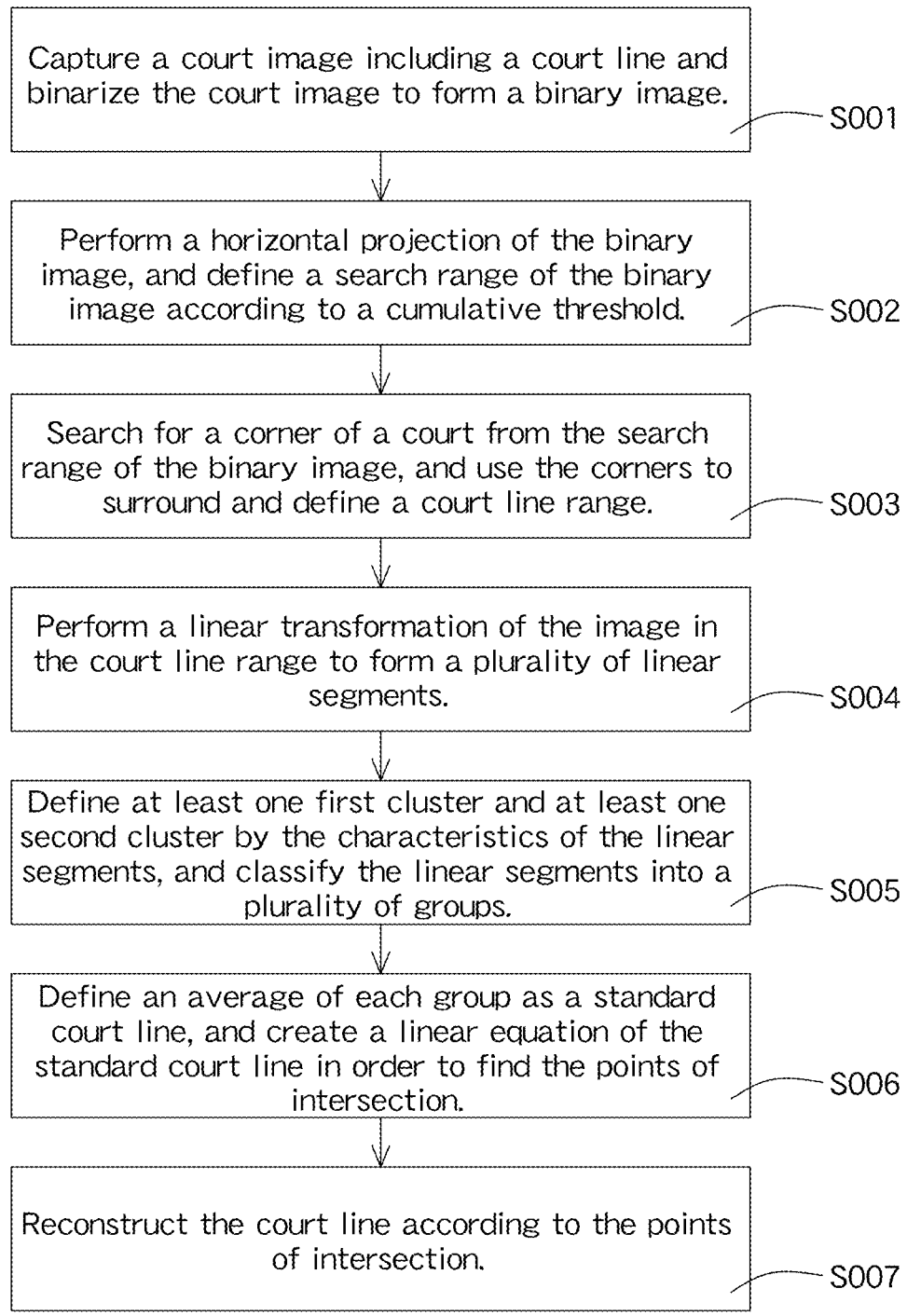
FIG. 1 is a flow chart of the present invention.
Figure 2:
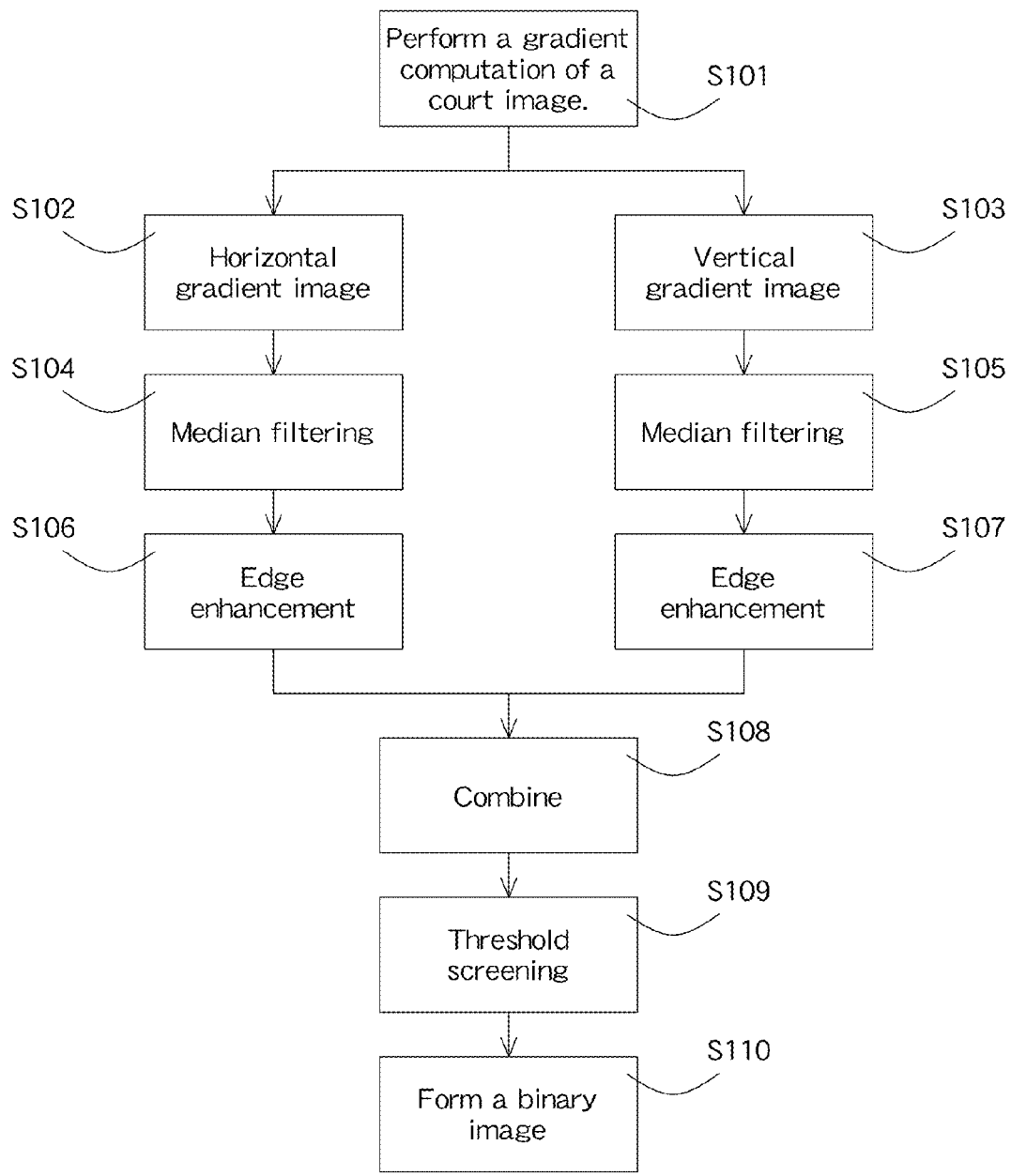
FIG. 2 is a flow chart of converting a court image into a binary image by the Sobel algorithm in accordance with the present invention.
Figure 3:
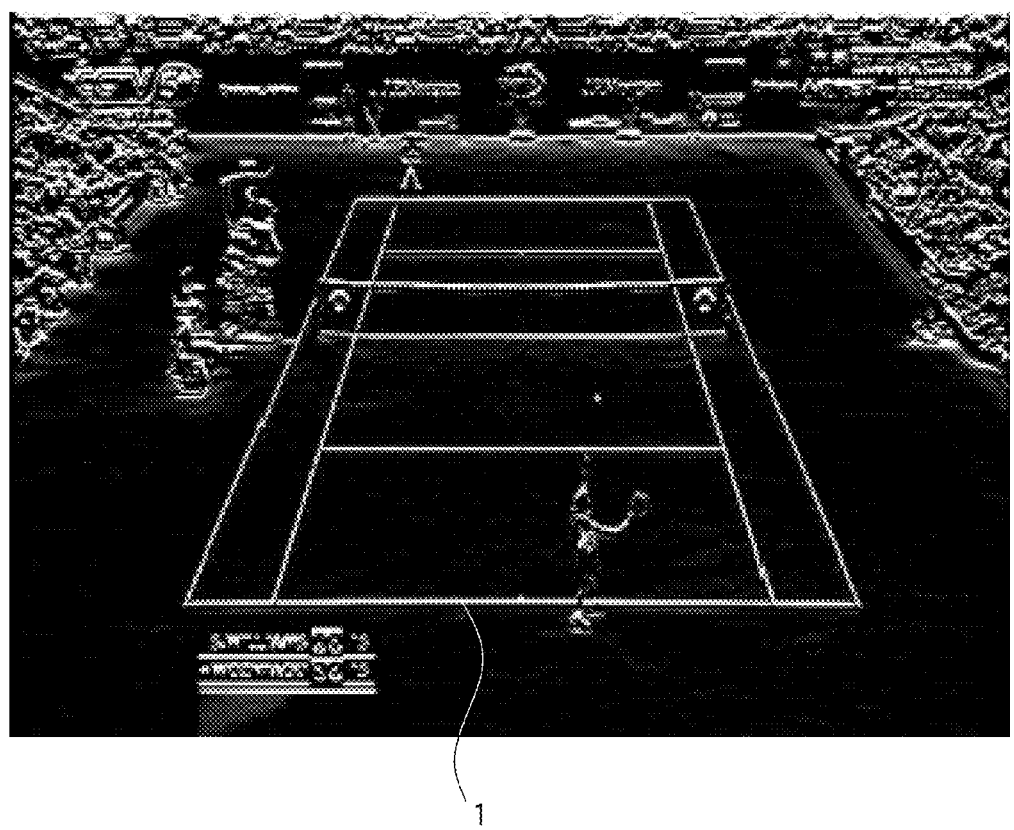
FIG. 3 is a schematic view of a horizontal gradient image of the present invention.
Figure 4:
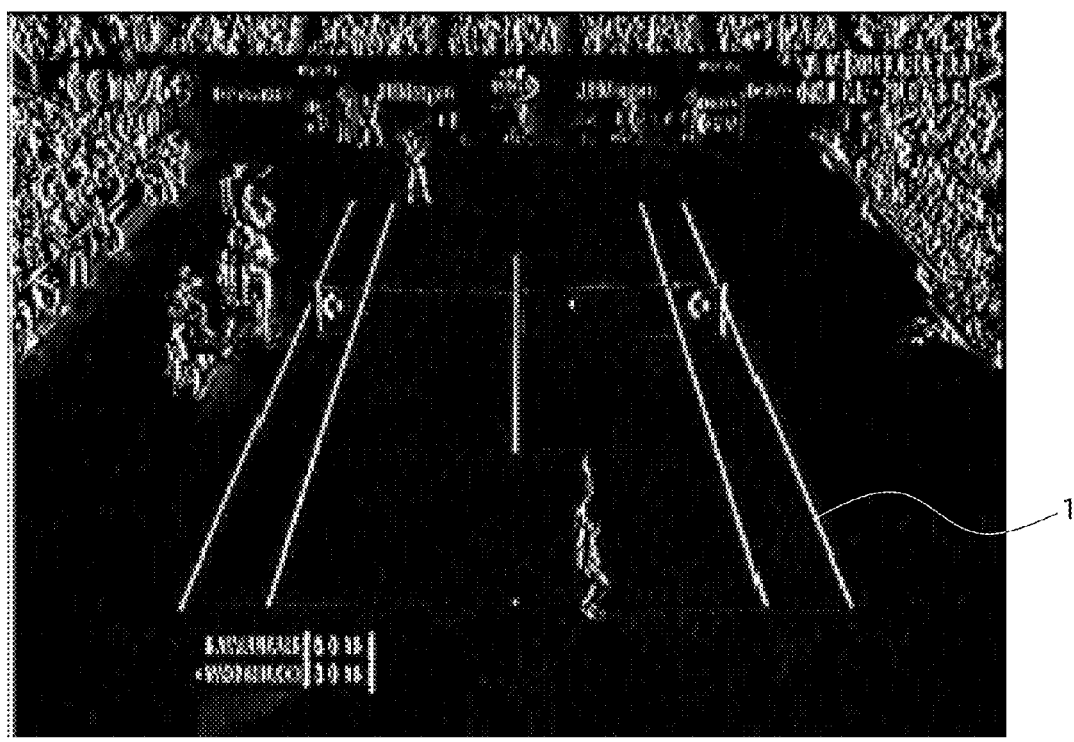
FIG. 4 is a schematic view of a vertical gradient image of the present invention.
Figure 5:
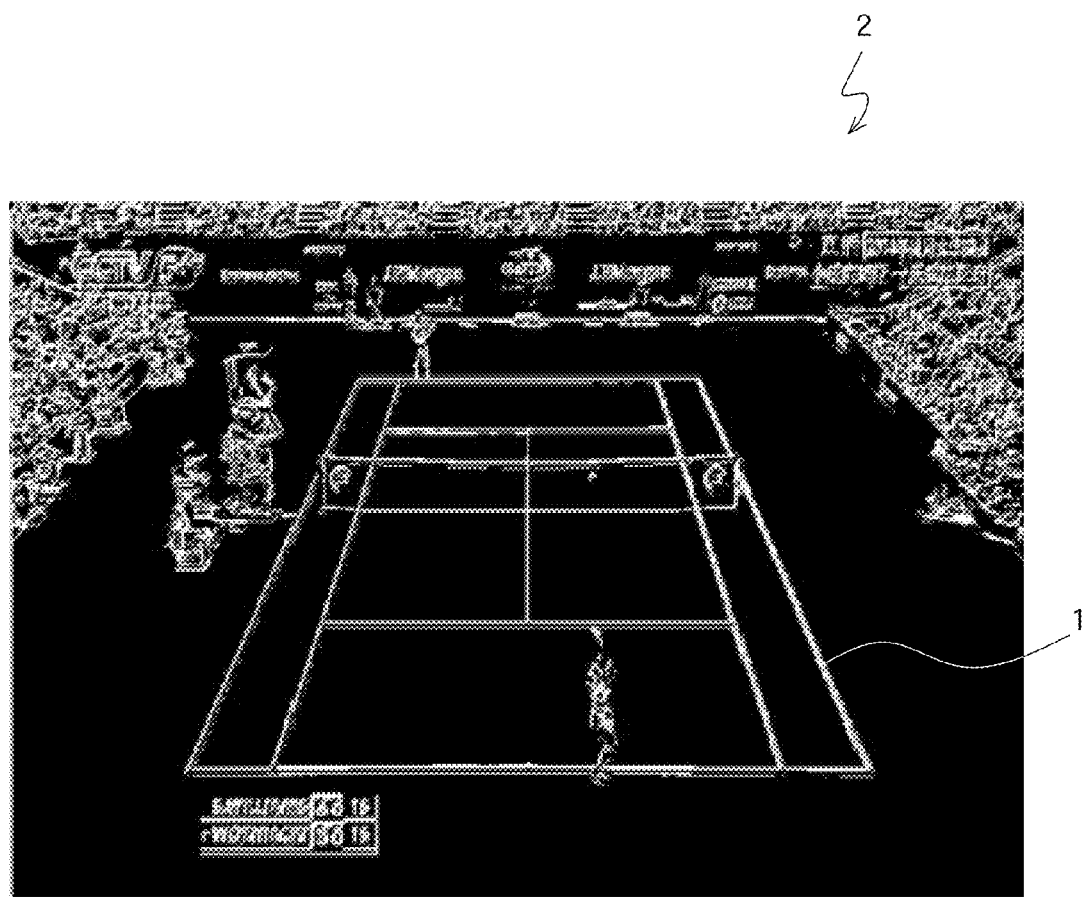
FIG. 5 is a schematic view of a binary image of the present invention.

With reference to FIG. 1 for a method of extracting and reconstructing court lines in accordance with the present invention, the method comprises the following steps:

S001: Capture a court image including a court line 1. It is noteworthy that the court image may include interference caused by a complicated background including audience, advertising signs, referees, a net, and players. To reduce the interference of the site background and the distortion of a video after being compressed and eliminate the possibility of losing a part of the court line which is stepped by the players or worn out, an embodiment of the present invention adopts the Sobel algorithm for gradient computation to obtain a high-quality binary image 2 while converting the court image into the binary image 2. In Steps S101 to S110 as shown in FIG. 2, a gradient computation of the court image is performed to generate a horizontal gradient image 21 and a vertical gradient image 22, a median filtering is performed to reduce noises as shown in FIGS. 3 and 4, and the ratio of the horizontal gradient of the horizontal gradient image 21 to the vertical gradient of the vertical gradient image 22 is increased, and the horizontal gradient image 21 and the vertical gradient image 22 are combined. Since the court lines 1 of the court are of the same color. With respect to the tennis court, the court line 1 is in white color, and a threshold may be defined according to a color range of the court line 1, and the threshold is used for screening the binary image 2 as shown in FIG. 5, and the binary image 2 is in the same color of the court line 1 (which is white in color), and the remaining ones are black in color. The top edge of the net in the tennis court is painted with a white thick line, so that the net image is also white in color.

Figure 6:
FIG. 6 is a schematic view of a first horizontal projection image of the present invention.

S002: Perform a horizontal projection of the binary image 2 to form a first horizontal projection image 3 as shown in FIG. 6, since the original court image still includes a background having the same color of the court line 1. In general, the court line 1 has a plurality of segments in specific directions. As to the tennis court line, there are more horizontal lines than vertical lines, so that the horizontal cumulative value obtained after the horizontal projection is divided into court line 1 and background noise. The horizontal projection of this embodiment refers to the plurality of segments in specific directions in the court line 1, but the present invention is not limited to the horizontal direction.

Define a cumulative threshold, and define a range of the first horizontal projection image 3 having a horizontal cumulative value greater than the cumulative threshold as a search range 5, and locate a corner in the search range 5.

Figure 7:
FIG. 7 is a schematic view of a second horizontal projection image of the present invention.

In a preferred embodiment, the noises of the first horizontal projection image 3 are filtered by the following Mathematical Equation 1 to form a second horizontal projection image 4 as shown in FIG. 7 in order to distinguish the court line 1 in the first horizontal projection image 3 and the background more easily.

$$F_i = \begin{cases} \dfrac{|p_i - \mu| \times k}{\sigma}, & p_i > \mu \\ 0, & \text{Otherwise} \end{cases} \quad \langle\text{Mathematical Equation 1}\rangle$$

Wherein, $F_i$ is a second horizontal projection image 4; $p_i$ is a horizontal cumulative value of the corresponding first horizontal projection image 3; $\mu$ is an average of the horizontal cumulative values of the first horizontal projection image 3; and $\sigma$ is a standard deviation.

The cumulative threshold is defined by Mathematical Equation 2 as follows:

$$T = \max\left(\dfrac{F_i}{\rho}\right); \quad \langle\text{Mathematical Equation 2}\rangle$$

wherein, $\rho$ is a magnification constant;

Define a range of the second horizontal projection image 4 having a horizontal cumulative value greater than the cumulative threshold as the search range 5.

Figure 8:
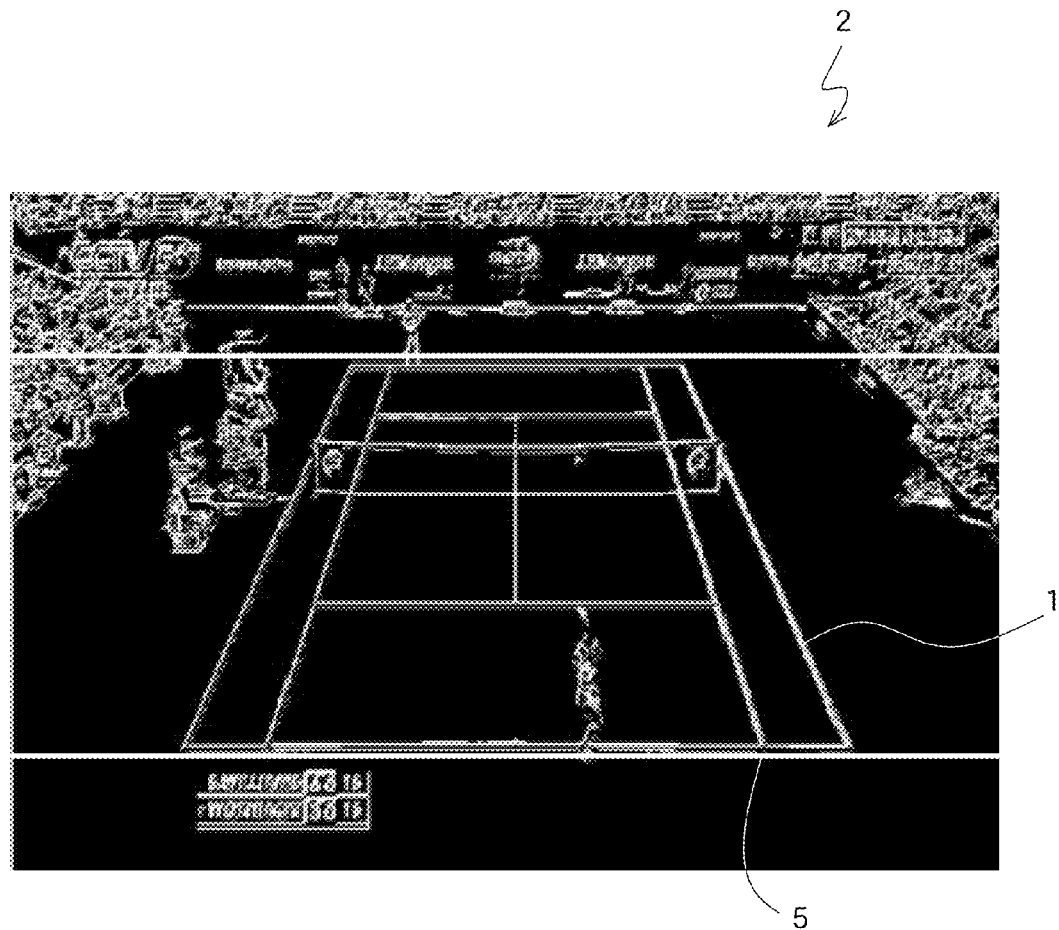
FIG. 8 is a schematic view of a search image in a binary image of the present invention.
Figure 9A:
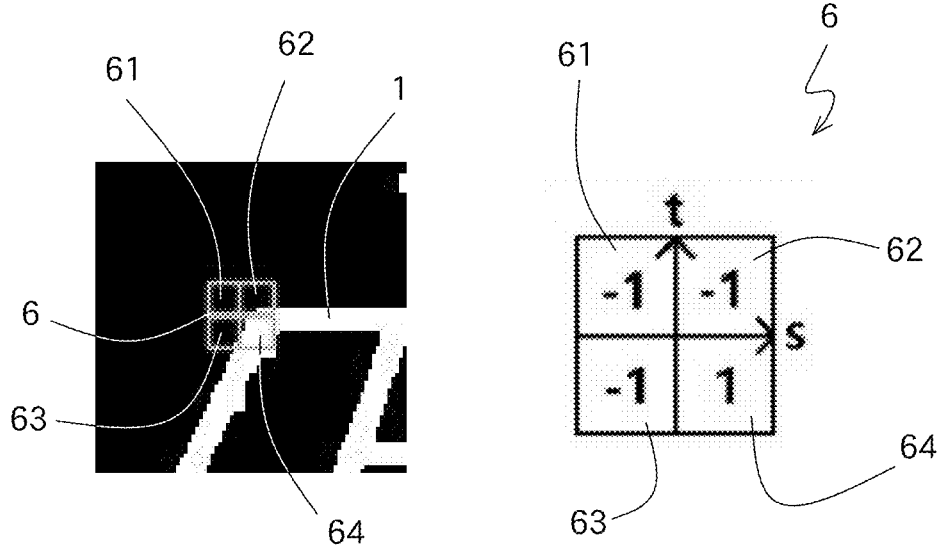
FIG. 9a is a schematic view of a pixel value of the upper left blank of a search image of the present invention.
Figure 9B:
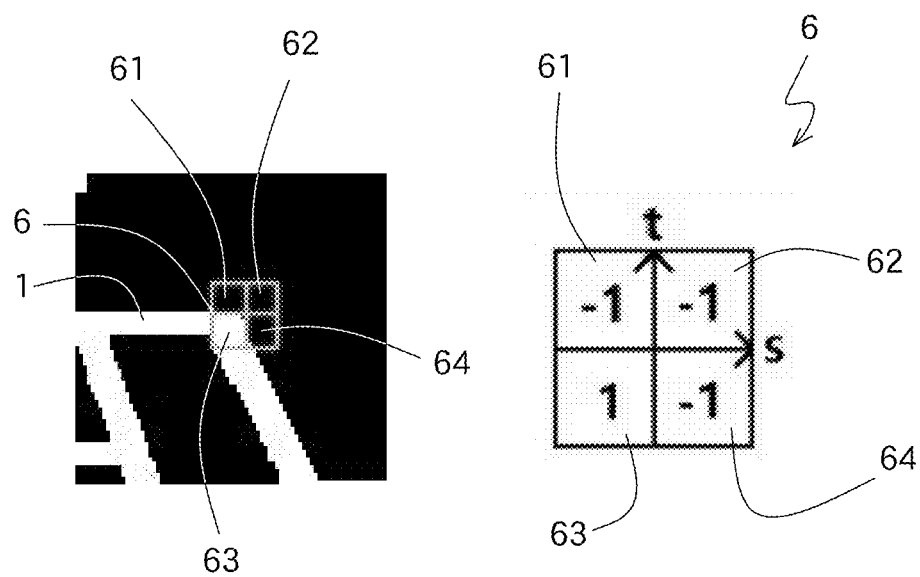
FIG. 9b is a schematic view of a pixel value of the upper right blank of a search image of the present invention.
Figure 9C:
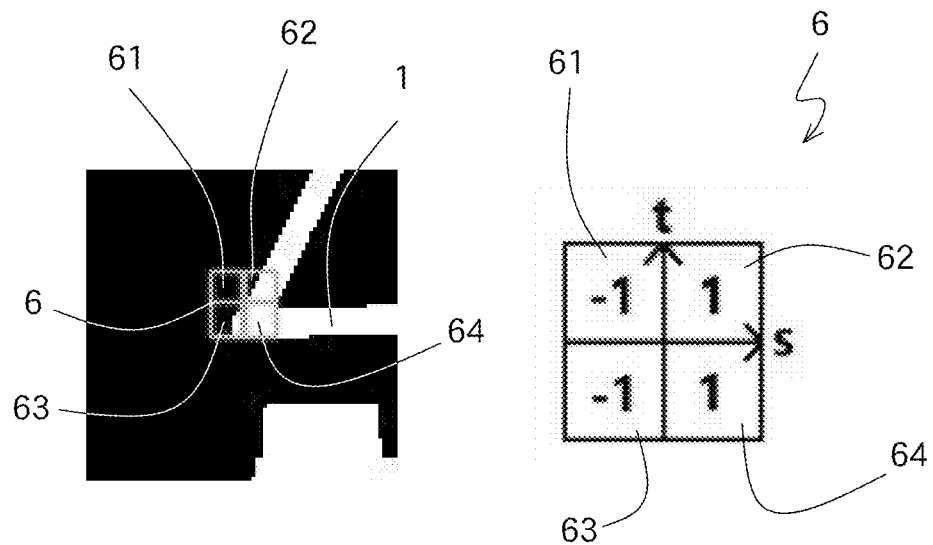
FIG. 9c is a schematic view of a pixel value of the lower left blank of a search image of the present invention.
Figure 9D:
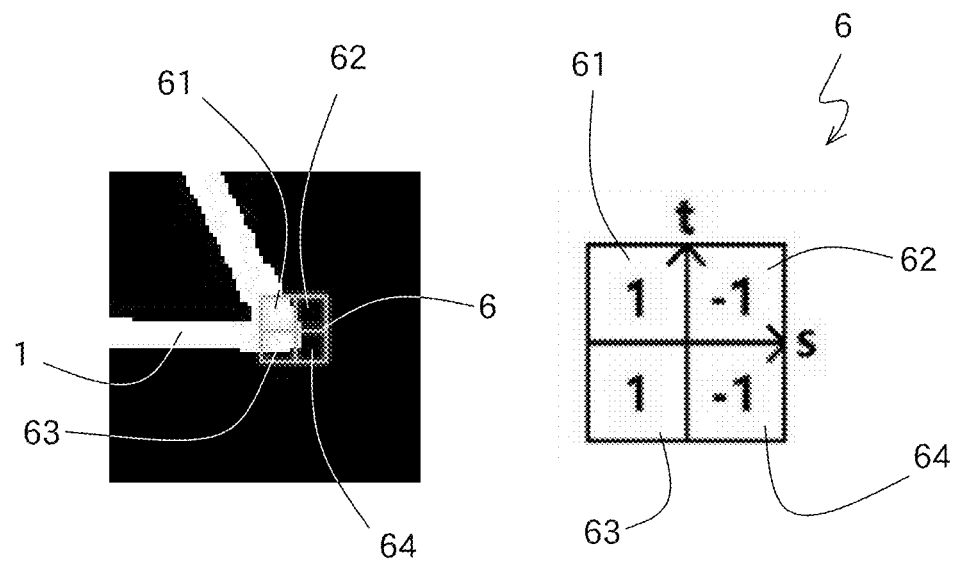
FIG. 9d is a schematic view of a pixel value of the lower right blank of a search image of the present invention.

In FIG. 8, the search range 5 is created in the binary image 2.

In an embodiment, even if the binary image 2 is clear, and the background and the court line 1 can be distinguished, or there is the image of the court line 1 only, or the corner of the court line 1 can be searched directly from the binary image 2, it is preferable to use horizontal projection for processing, since it is always difficult to distinguish the background and the court line 1.

In another embodiment, the horizontal projection of the first horizontal projection image 3 is performed at the middle third of the binary image 2, since the court line 1 just occupies the middle third of the court image in most court images including audience and advertising, so as to expedite the computation. However, the present invention is not limited by such arrangement only.

S003: Search a corner of the court line 1 from the search range 5 of the binary image 2 after the search range 5 is created, and use the corners to surround and define a court line range.

In a preferred embodiment, the plurality of court lines 1 is arranged into a rectangular shape. Due to a possible deviation of angle of a camera occurred while capturing an image, the court line 1 may be distorted into a trapezium or a quadrilateral. In this embodiment, a binary search image 6 and its search coordinates are created, and the search image 6 is divided into an upper left blank 61, an upper right blank 62, a lower left blank 63 and a lower right blank 64 by the search coordinates. For example, the search image 6 of this embodiment is "⊞" shaped.

In the binary image 2, the white pixel is represented by "1" and the black pixel is represented by "0", and the white pixel above the pattern (which is the search image 6) is represented by "1" and the black pixel below the pattern is represented by "−1". The search image 6 is slidably searched in the binary image 2, and a convolution is performed with the binary image 2 as shown in FIGS. 9a to 9d to show the search images 6 of the court line 1 at different situations and the pixel values of the upper left blank 61, the upper right blank 62, the lower left blank 63 and the lower right blank 64. Mathematical Equation 3 is used for the computation as follows:

$$O(i,j) = \Sigma_{s=-4}^{4} \Sigma_{t=-4}^{4} m(s,t) \times p(i+s, j+t);$$

$$(i^*, j^*) = \arg\max O(i,j); \quad \langle\text{Mathematical Equation 3}\rangle$$

Wherein, $O(i,j)$ is a corner; $m(s,t)$ is a search image 6; and $p(i,j)$ is a binary image 2.

Therefore, the maximum obtained after the convolution is defined as the corner, and the corners are used to define a court line range, so as to eliminate the noise outside the court line range. Now, the image within the court line range is just an image including the court line 1.

Figure 10:
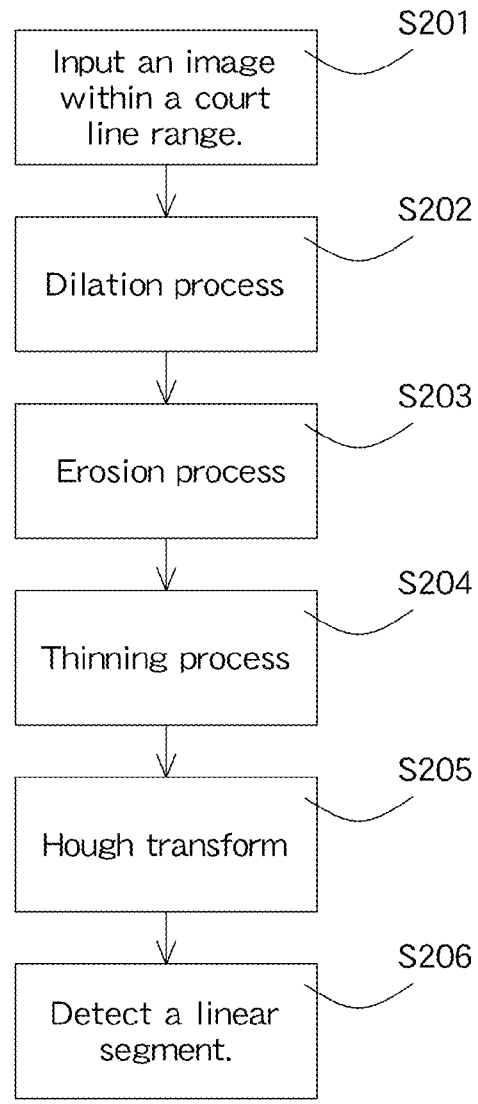
FIG. 10 is a flow chart of the step of performing a closing process to the step of generating a focal point in accordance with the present invention.
Figure 11:
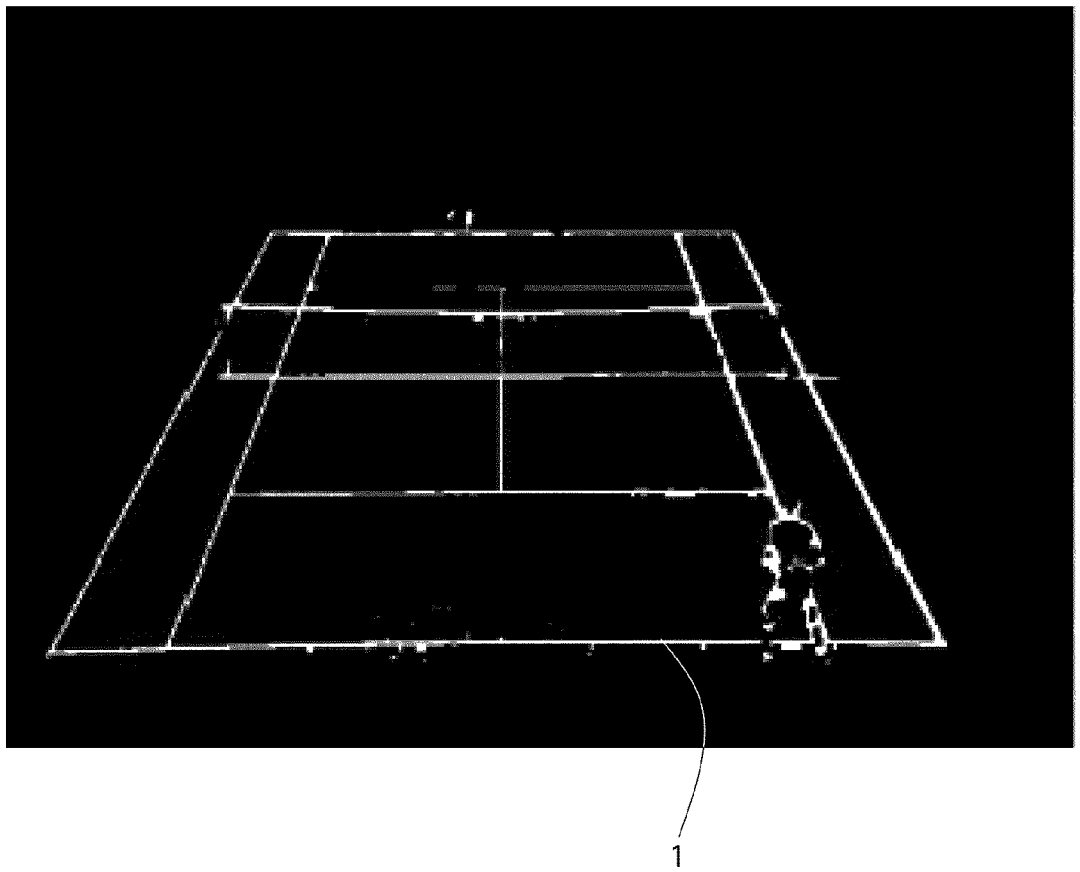
FIG. 11 is a schematic view of the present invention after a closing process takes place.
Figure 12:
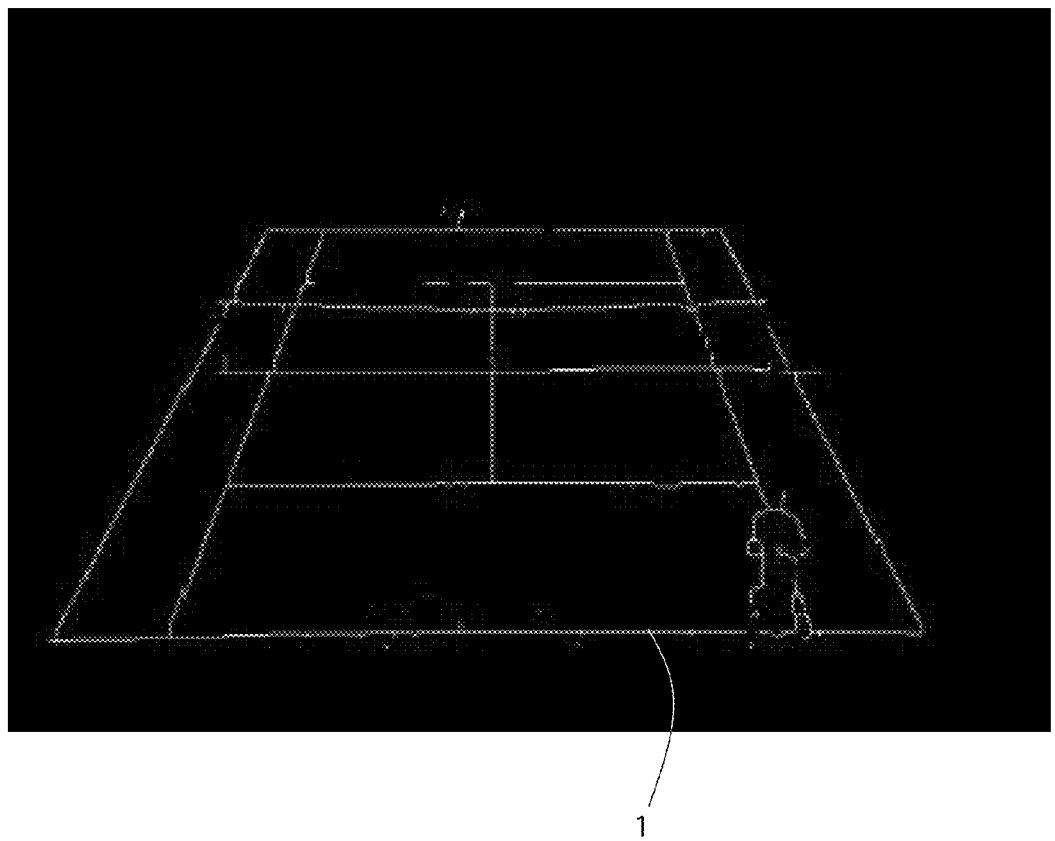
FIG. 12 is a schematic view of the present invention after a thinning process takes place.
Figure 13:
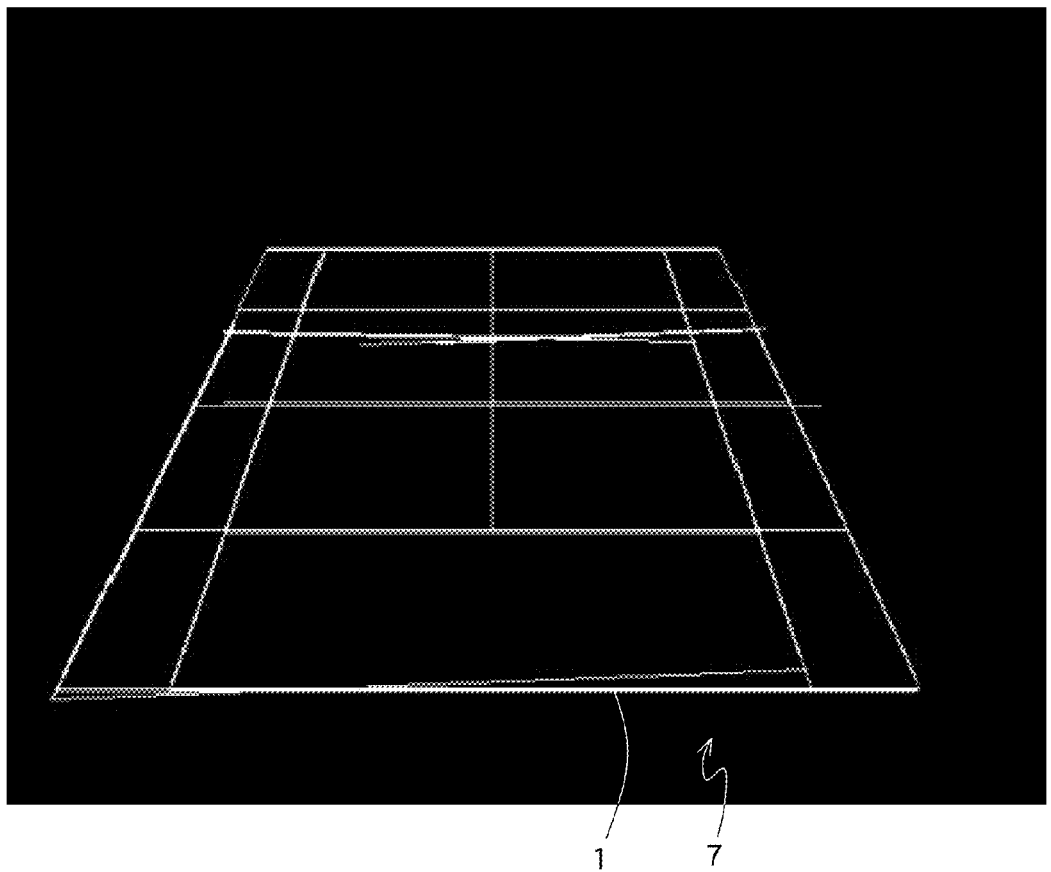
FIG. 13 is a schematic view of the present invention after a Hough transform takes place.

S004: Search for a point of intersection 9 of the court line in order to reconstruct the court line 1. Since the photographed court line 1 of the original court image may be covered by dust or the court line 1 in the court image is blocked due to the light factor varied with time in the process of taking the photos. Therefore, a closing process of the image within the court line range as shown in the Steps S201 to S206 of FIG. 10 is performed in this embodiment. In other words, the image within the court line range is dilated to fill the gap of the segment or the broken line of the court line 1, and then an erosion process is performed as shown in FIG. 11. After the closing process, a thinning process of the obtained image is performed as shown in FIG. 12, so that the width of each line is converted into a unit pixel, and then a Hough transform is performed to detect a linear segment 7 of the image obtained after the thinning process, and the linear segment 7 is one intersecting with most points of a straight line on a parametric plane.

S005: Due to the depression of the net and the fisheye effect of the camera, the image of the court line 1 is distorted, so that segments with repetitions, superimpositions, or noises are produced after the Hough transform takes place, and a filtering process is required. Therefore, the present invention defines at least one first cluster and at least one second cluster according to the characteristics of the linear segment 7 by K-means clustering, and the linear segment 7 is classified into a plurality of groups according to the first cluster and the second cluster, so that the tennis court line just includes vertical lines and horizontal lines only, and the first cluster is used for classifying the horizontal segment in the linear segment 7 according to the slope and the position of the Y-axis coordinate, and the second cluster is used to classify the vertical segment in the linear segment 7 according to the slope and the intercept.

Figure 14:
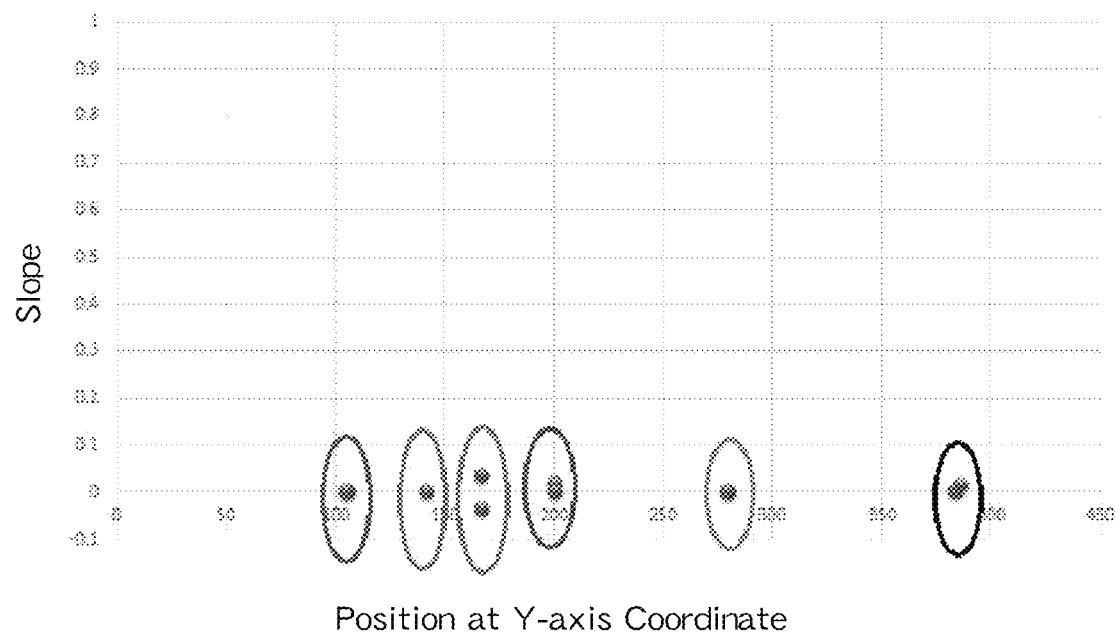
FIG. 14 is a classification chart of a linear segment classified by a first cluster as a different group in accordance with the present invention.
Figure 15:
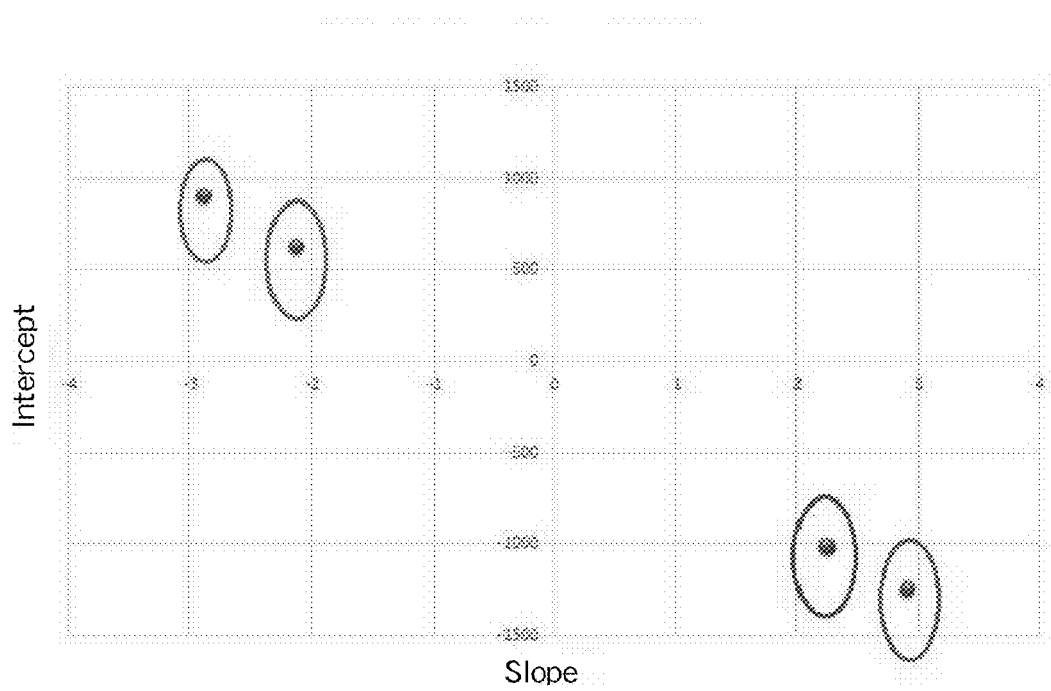
FIG. 15 is a classification chart of a linear segment classified by a second cluster as a different group in accordance with the present invention.

In the linear segment 7, the court line 1 of the tennis court includes six transverse lines and five vertical lines, so that six first clusters and five second clusters are defined, and the horizontal segments and the vertical segments marked in FIGS. 14 and 15 are classified into similar groups respectively. Since the vertical segments cannot be computed, therefore the vertical segments are created directly by the vertical lines according to the position of the X-axis coordinate.

Figure 16:
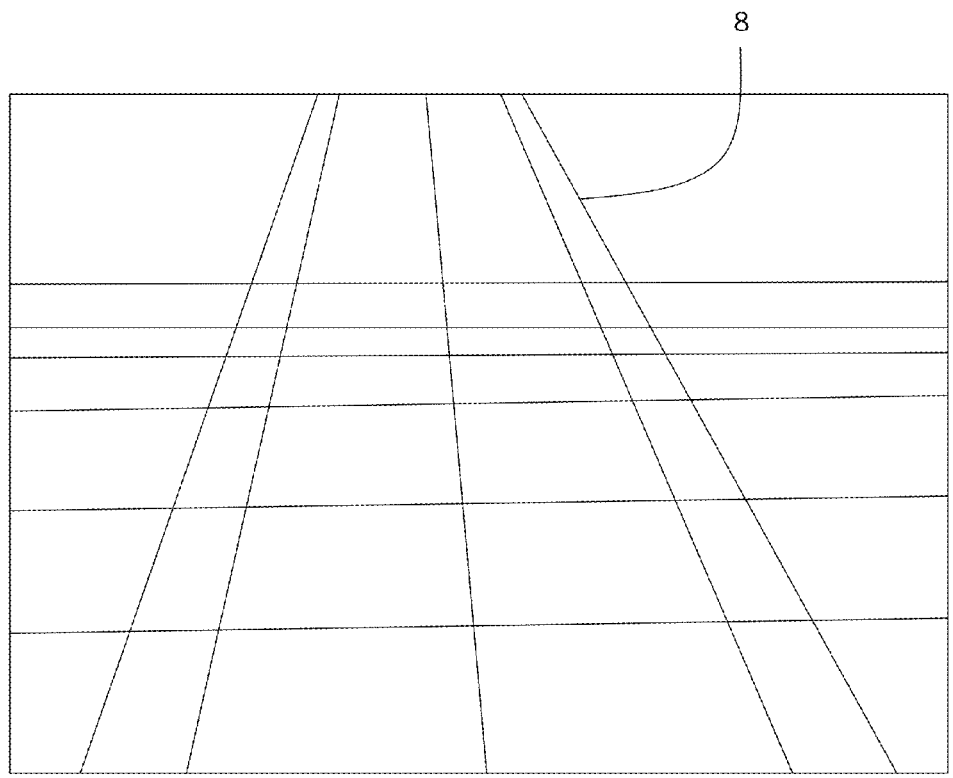
FIG. 16 is a schematic view of defining a standard court line in accordance with the present invention.
Figure 18:
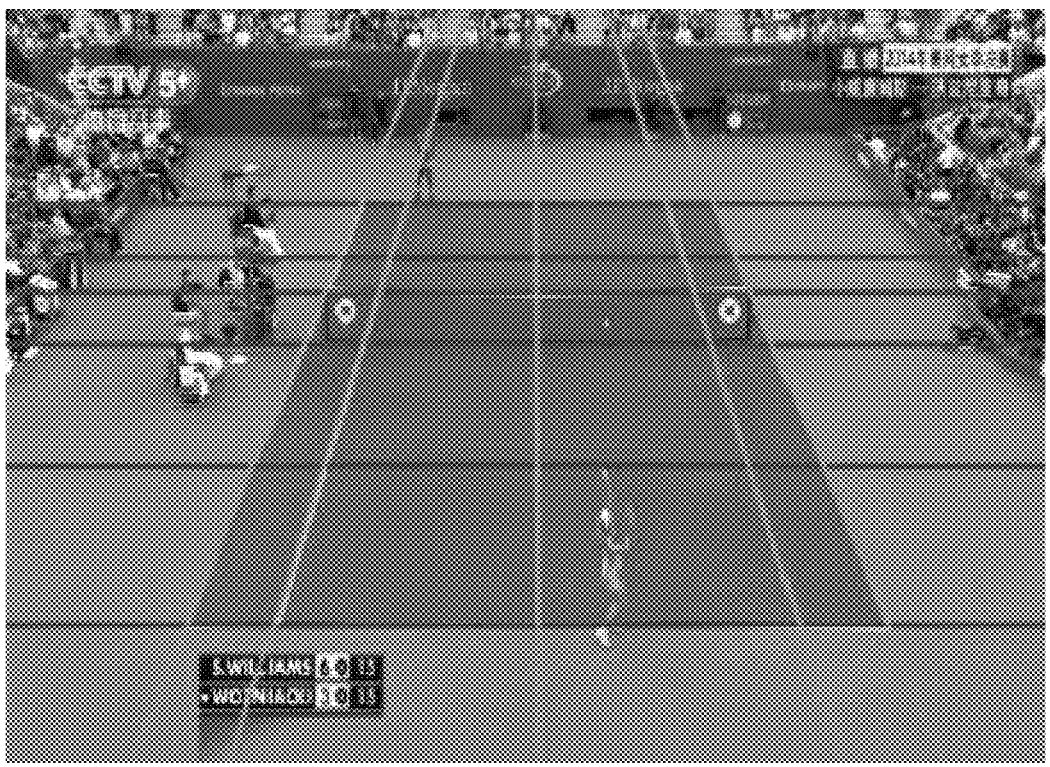
FIGS. 18 and 19 are experiment charts of creating a standard court line in a court image in accordance with the present invention.
Figure 19:
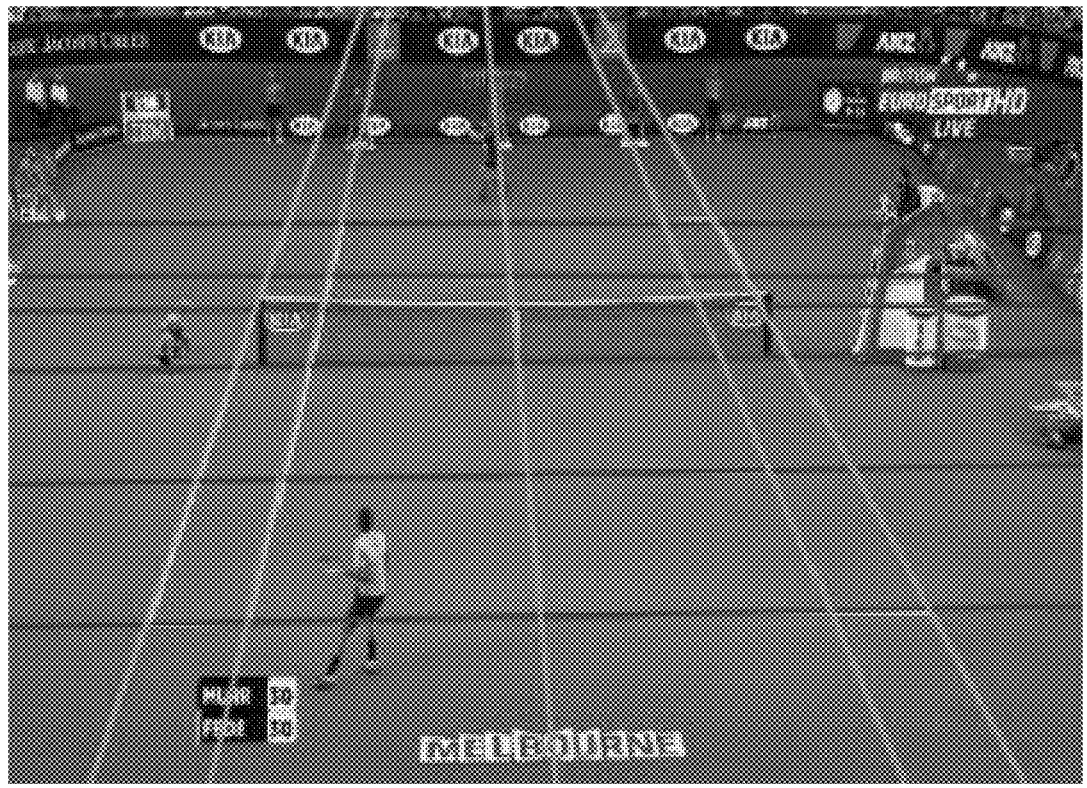

S006: Take an average of each group as a standard court line 8, and create linear equations of the standard court line 8 as shown in FIGS. 16, 18 and 19, so as to find the position of the point of intersection 9 of the standard court line 8.

Figure 17:
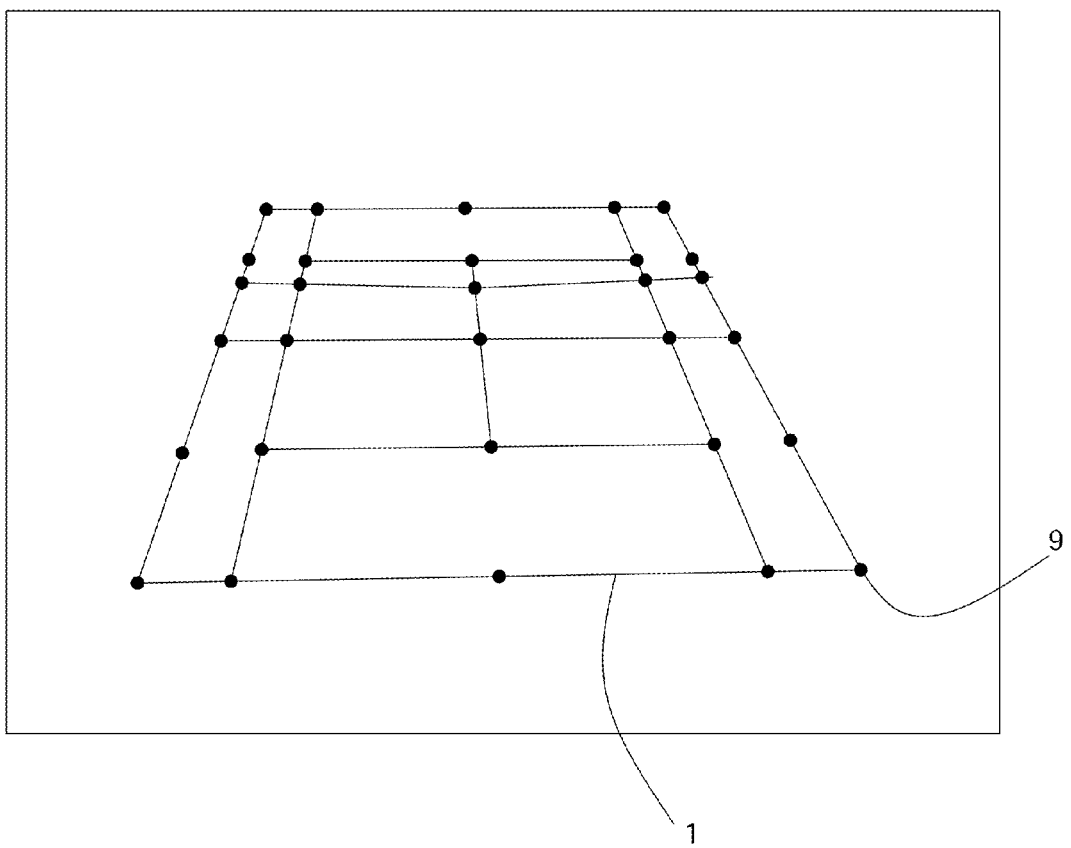
FIG. 17 is a schematic view of defining a point of intersection and reconstructing a court line in accordance with the present invention.
Figure 20:
FIGS. 20 and 21 are experiment charts of creating a point of intersection in a court image in accordance with the present invention.
Figure 21:
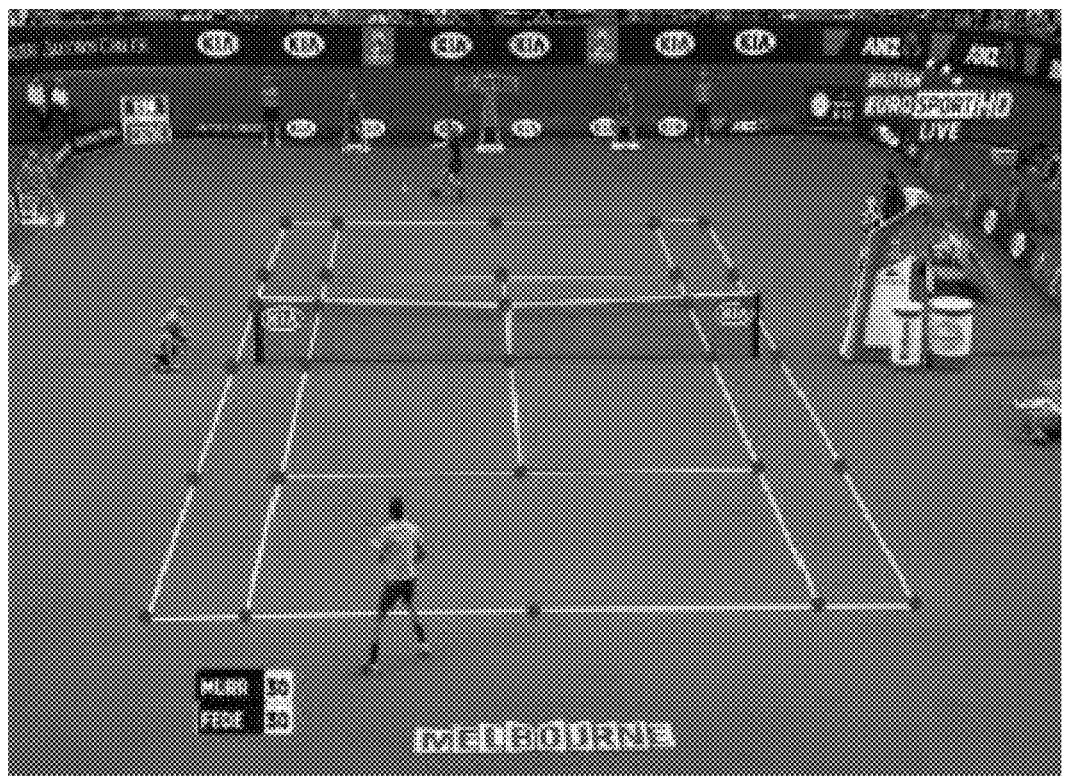
Figure 22:
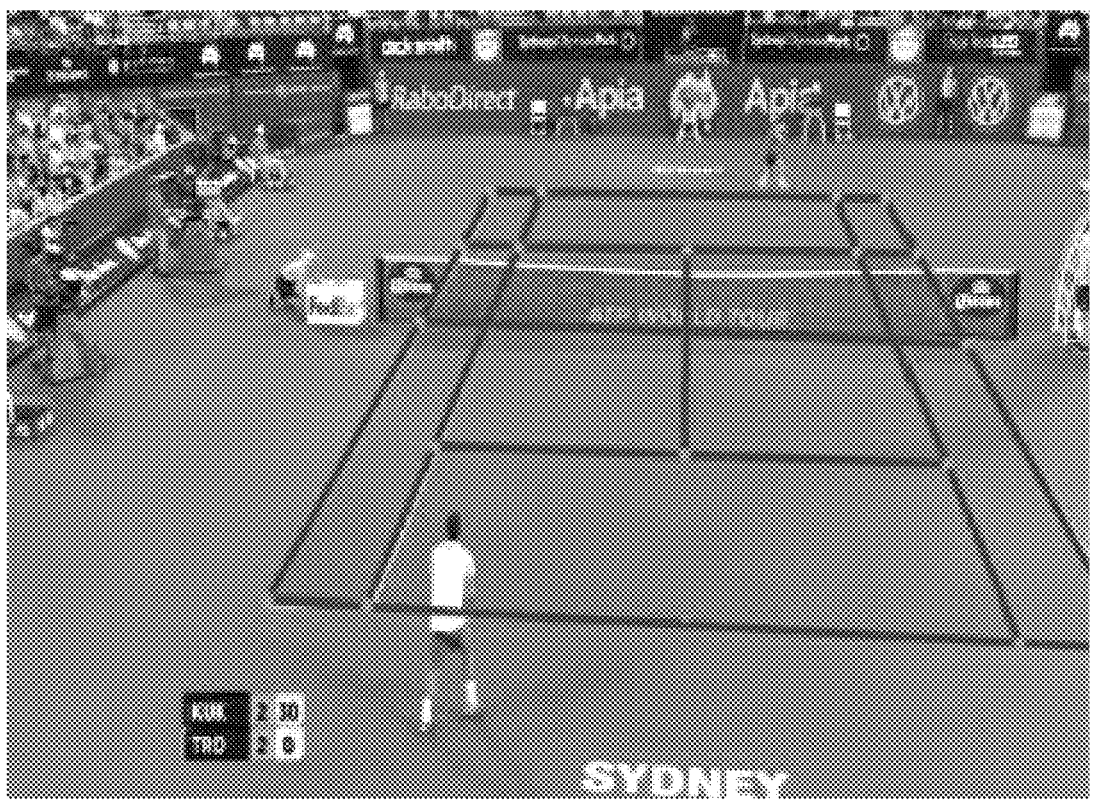
FIGS. 22 to 29 are experiment charts of reconstructing a court line in a court image in accordance with the present invention.
Figure 23:
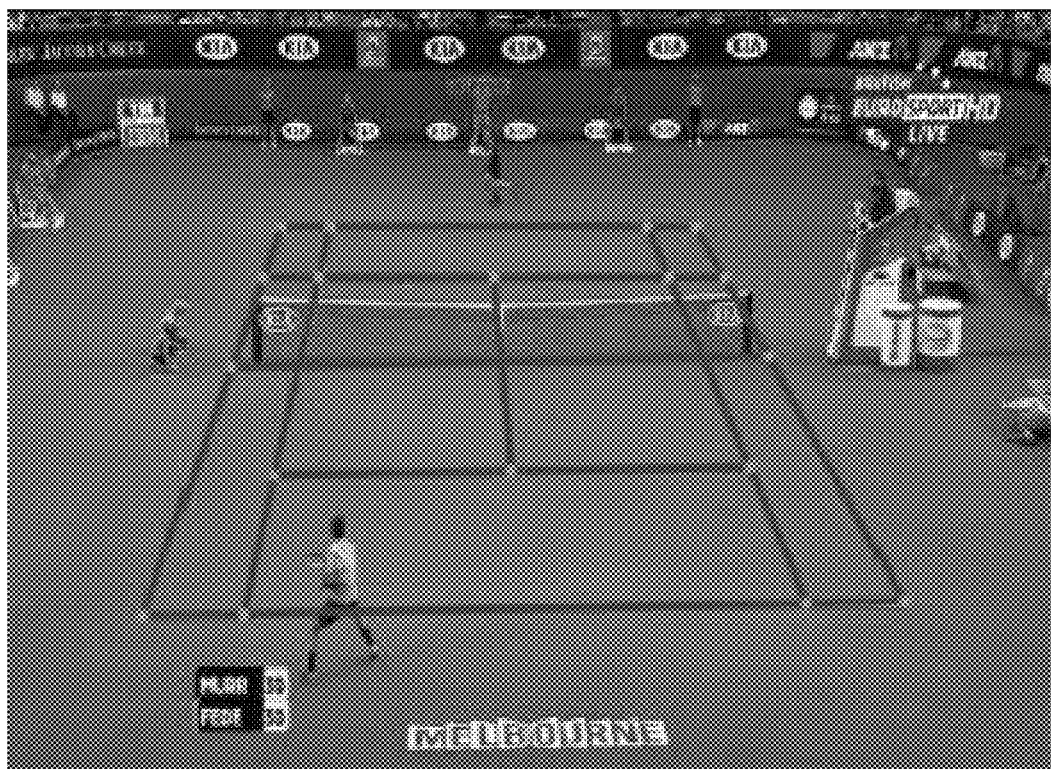
Figure 24:
Figure 25:
Figure 26:
Figure 27:
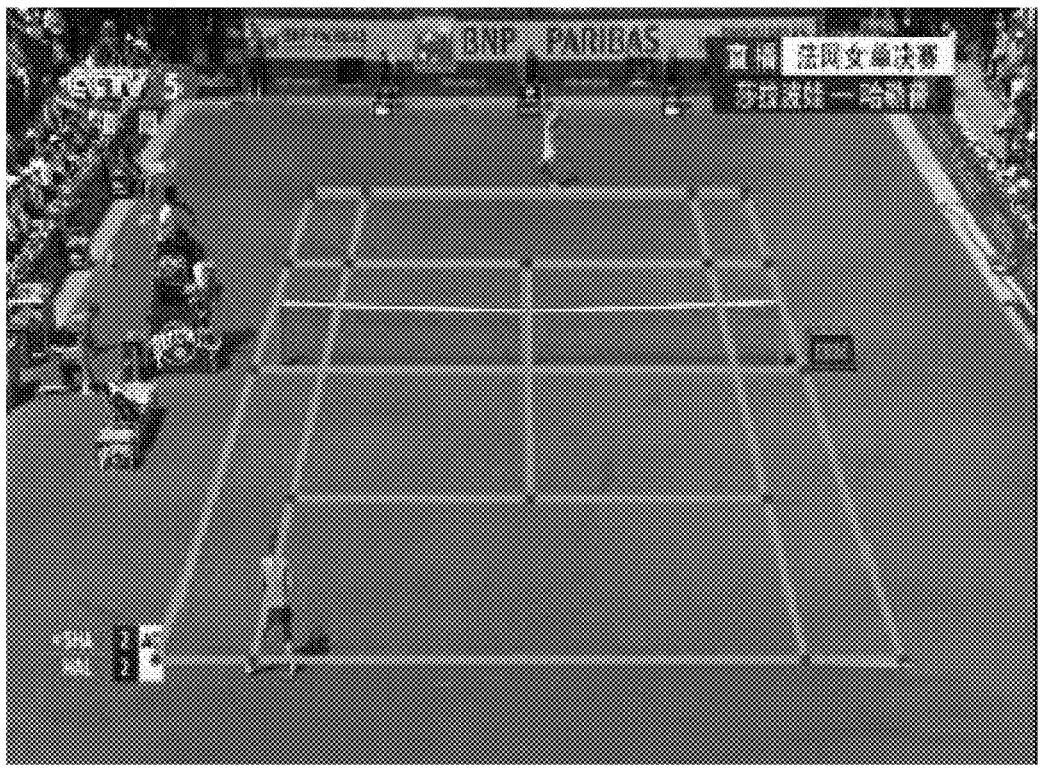
Figure 28:
Figure 29:

S007: With reference to FIGS. 17, 20 and 21, the court line 1 of this embodiment is a tennis court line including a net, so that 30 points of intersection 9 can be found. After the points of intersection are found, the court line 1 can be reconstructed according to the points of intersection 9 and the actual position of the court line 1 by a line function.

However, errors may occur in some situations while reconstructing the court line 1, so that an error filtering step is required. If the court image is a dynamic continuous image, and a reconstruction error occurs, the distance value of the points of intersection 9 compared with the distance value created by the adjacent previous frame will be computed by Mathematical Equation 4 as follows:

$$|P_i(k+1)-P_i(k)|<T_1, \ i=1,2,\ldots,30 \quad \text{<Mathematical Equation 4>}$$

Wherein, $T_1$ is a first constant value.

If the point of intersection 9 $P_i$ fits the Mathematical Equation 4, then a computing value is accumulated, and if the computing value is greater than the second constant value, then an error threshold $T_e$ will be computed. In this embodiment, the second constant value is set to 2 as shown in Mathematical Equation 5:

$$T_e = \frac{\alpha}{30}\left[\sum_{i=1}^{30} |P_i(k+1)-P_i(k)|\right] \quad \text{<Mathematical Equation 5>}$$

Wherein, $\alpha$ is an error magnification constant;

If the distance value of the points of intersection 9 at the positions of any previous and current frames are greater than the error threshold (or matches Mathematical Equation 6), then the court line 1 of the current frame with a reconstruction error is replaced by the court line 1 reconstructed by the previous frame.

$$|P_i(k+1)-P_i(k)|>T_e \quad \text{<Mathematical Equation 6>}$$

In summation, this embodiment as shown in FIGS. 22 to 29 tests different tennis courts at different sites for the tennis match video with a size of 720*480 and a length of 10 seconds, and the backgrounds including the camera position, angle, zooming, background color, advertising, and scoreboard are different, and results show that a complete court line 1 can be captured and reconstructed successfully.

In this embodiment, the accuracy of reconstructing the court line 1 before performing the error filtering step is approximately 98.4% to 99.7%, and the accuracy of reconstructing the court line 1 after performing the error filtering step reaches 100% (such statistics are obtained from ten thousand videos of open competitions). Obviously, the present invention can locate the point of intersection 9 in the court image accurately to facilitate the reconstruction of the court line 1.

While this disclosure has been described by means of specific embodiments, numerous modifications and variations could be made thereto by those skilled in the art without departing from the scope and spirit of this disclosure set forth in the claims.

What is claimed is:

1. A method of extracting and reconstructing court lines in an image showing a court, comprising:

executing a processor to binarize a court image of a court having court lines to form a binary image, the binary image reducing the court image in image content to visually isolate the court lines in the court image from other features in the court image;

executing a processor to search for a plurality of corners in the binary image and defining a court line range based on the plurality of corners;

executing a processor to apply a linear transformation to form a plurality of linear segments respectively extending between the corners within the court line range;

executing a processor to define at least one first cluster and at least one second cluster according to predetermined characteristics of the linear segments, and categorizing the linear segments into a plurality of groups according to the first cluster and the second cluster;

executing a processor to determine for each group a standard court line based on an averaging of the linear segments of the group, and generating a linear equation for each standard court line to locate respective positions of points of intersection of the standard court lines; and executing a processor to reconstruct the court image by superimposing thereon indicia representative of the standard court lines according to the points of intersection.

2. The method of extracting and reconstructing court lines in an image showing a court according to claim 1, further comprising determining both a horizontal gradient image and a vertical gradient image, and combining the horizontal gradient image and the vertical gradient image to form the binary image.

3. The method of extracting and reconstructing court lines in an image showing a court according to claim 2, further comprising determining a threshold according to colors of the court lines in the court image, and determining the horizontal gradient image and the vertical gradient image according to the threshold.

4. The method of extracting and reconstructing court lines in an image showing a court according to claim 1, further comprising horizontally projecting the binary image to form a first horizontal projection image; determining a search range of the first horizontal projection image according to a horizontal cumulative value greater than a cumulative threshold, and searching for the plurality of corners in the search range.

5. The method of extracting and reconstructing court lines in an image showing a court according to claim 4, further comprising filtering out noise in the first horizontal projection image to form a second horizontal projection image according to an Equation 1 as follows:

$$F_i = \begin{cases} \frac{|p_i - \mu| \times k}{\sigma}, & p_i > \mu \\ 0, & \text{Otherwise} \end{cases};$$

wherein, $F_i$ corresponds to a second horizontal projection image; $p_i$ represents a horizontal cumulative value of the corresponding first horizontal projection image; $\mu$ represents an average of the horizontal cumulative values of the first horizontal projection image; and $\sigma$ represents a standard deviation;

determining the cumulative threshold according to an Equation 2 as follows:

$$T = \max\left(\frac{F_i}{\rho}\right);$$

wherein, $\rho$ represents a magnification constant; and
defining a range of the second horizontal projection image with a horizontal cumulative value greater than the cumulative threshold as the search range.

6. The method of extracting and reconstructing court lines in an image showing a court according to claim 4, wherein middle third of the binary image is horizontally projected to form the first horizontal projection image.

7. The method of extracting and reconstructing court lines in an image showing a court according to claim 1, further comprising defining the court lines as a quadrilateral, and generating a binary search image and corresponding search coordinates, and dividing the search image into an upper left blank, an upper right blank, a lower left blank and a lower right blank according to the search coordinates; searching the search image within the binary image, and performing a convolution of the binary image with the search image; and defining the maximum as the corner.

8. The method of extracting and reconstructing court lines in an image showing a court according to claim 7, wherein the convolution of the search image and the binary image is carried out according to an Equation 3 as follows:

$$O(i,j)=\Sigma_{s=-4}^{4}\Sigma_{t=-4}^{4}m(s,t) \times p(i+s,j+t); (i^*,j^*)=\underset{(i,j)}{\operatorname{argmax}} O$$

wherein $O(i,j)$ represents a corner; $m(s,t)$ represents a search image; and $p(i,j)$ represents a binary image.

9. The method of extracting and reconstructing court lines in an image showing a court according to claim 1, further comprising executing a thinning process subsequent to an image captured in the court line range being processed by a closing process.

10. The method of extracting and reconstructing court lines in an image showing a court according to claim 1, further comprising executing a Hough transform on the court lines in the court line range to form the linear segments.

11. The method of extracting and reconstructing court lines in an image showing a court according to claim 1, wherein the predetermined characteristics include a horizontal and a vertical line, and categorizing horizontal segments in the first cluster according to a slope and a position of a Y-axis coordinate of the linear segment; and categorizing vertical segments in the second cluster according to a slope and an intercept of the linear segment.

12. The method of extracting and reconstructing court lines in an image showing a court according to claim 11, wherein the court line is a tennis court line, and six first clusters and five second clusters are determined.

13. The method of extracting and reconstructing court lines in an image showing a court according to claim 1, wherein the court image is reconstructed by a line function.

14. The method of extracting and reconstructing court lines in an image showing a court according to claim 1, wherein the court line is a tennis court line, and 30 points of intersection are determined.

15. The method of extracting and reconstructing court lines in an image showing a court according to claim 14, further comprising setting the reconstructed court image as a dynamic continuous image, defining a first constant value, a second constant value and a computing value, computing the distance value between the point of intersection of the current court image position and the point of intersection of the previous court image at the corresponding position, and increasing the computing value if the distance value is smaller than the first constant value, and computing an error threshold $T_e$ by an Equation 4 if the computing value is greater than the second constant value as follows:

$$T_e = \frac{\alpha}{30}\left[\sum_{i=1}^{30} |P_i(k+1) - P_i(k)|\right]$$

wherein $\alpha$ represents an error magnification constant; and
replacing the reconstructed court line of the current frame by the reconstructed court line of the previous frame if the distance value is greater than the error threshold at any point of intersection.

* * * * *